Dec. 8, 1953

E. J. HITCHCOCK 2,661,777

SELF-ADJUSTING MOTOR MOUNTING FOR
VERTICALLY ADJUSTED SAWS

Filed Sept. 15, 1952

Edgar J. Hitchcock
INVENTOR.

BY *Clarence A. O'Brien
and Harvey B. Jacobson*
Attorneys

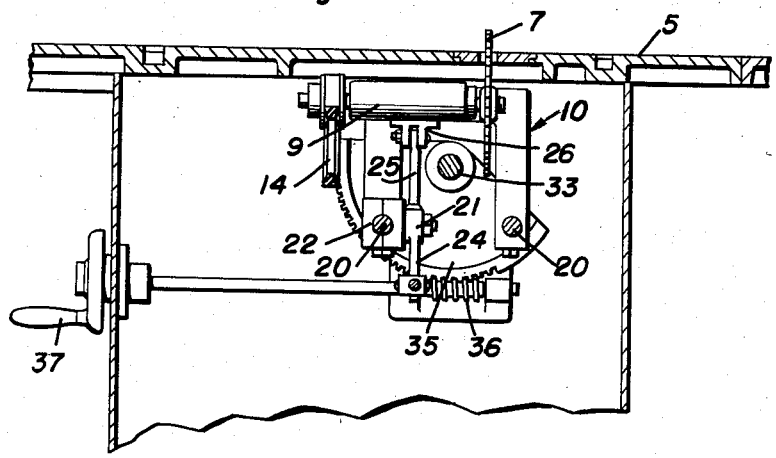
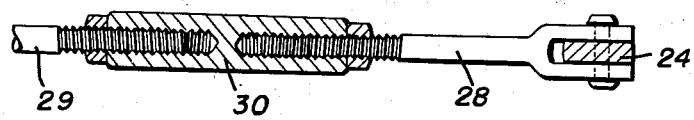
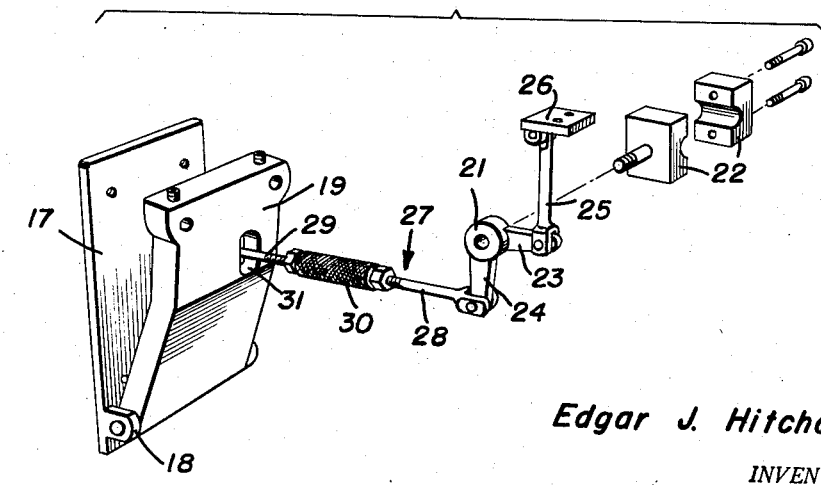

Patented Dec. 8, 1953

2,661,777

UNITED STATES PATENT OFFICE 2,661,777

SELF-ADJUSTING MOTOR MOUNTING FOR VERTICALLY ADJUSTED SAWS

Edgar J. Hitchcock, New Philadelphia, Ohio

Application September 15, 1952, Serial No. 309,623

2 Claims. (Cl. 143—35)

The present invention relates to new and useful improvements in circular saws equipped with angle as well as vertical adjusting means and more particularly to adjusting means for a motor mounting synchronizing the adjustment of the motor with the adjustment of the saw to maintain uniform tension on the belt drive means for the saw.

An important object of the invention is to provide an adjusting mechanism connecting the vertically adjustable arm of the saw arbor with an adjustable mounting for the motor to simultaneously adjust the motor and saw.

Another object is to provide an adjusting mechanism of this character embodying means for adjusting the motor mounting relative to the saw.

A further object is to provide a device of this character of simple and practical construction, which is efficient and reliable in operation, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, in which:

Figure 3 is a vertical sectional view taken on a line 3—3 of Figure 2.

Figure 4 is a longitudinal sectional view of the turnbuckle adjusting means for the saw and motor mounting connecting mechanism and Figure 5 is an enlarged group perspective view of the connecting mechanism.

Figure 1:
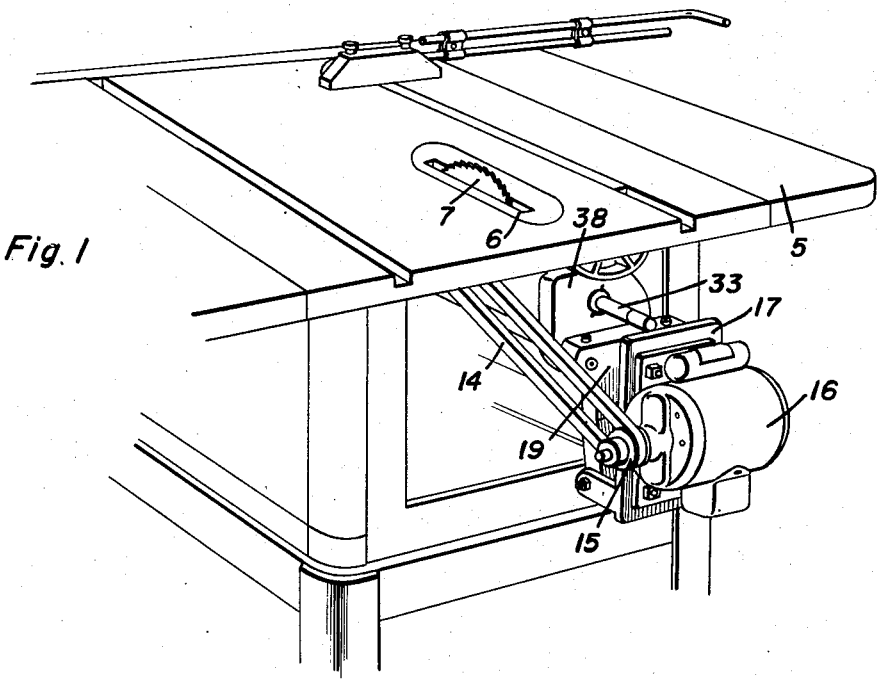
Figure 1 is a perspective view of the saw machine.
Figure 2:
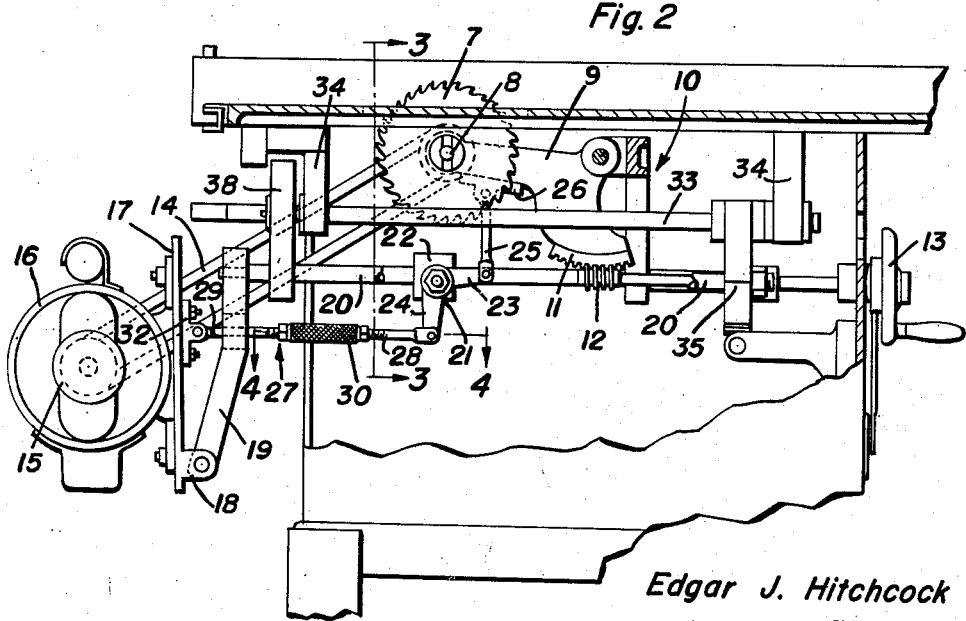
Figure 2 is a side elevational view with parts shown in section.

Referring now to the drawings in detail, wherein for the purpose of illustration I have disclosed a preferred embodiment of my invention, the numeral 5 designates a saw table having a slot 6 in which a circular saw 7 is vertically adjustable.

The saw is secured to a shaft 8 which is journaled in the outer end of an arbor arm 9 pivoted for vertical swinging movement on an inverted U-shaped angle adjusting bracket designated generally at 10, arm 9 being formed with a worm gear segment 11 actuated by a worm 12 and hand wheel 13 at the front of the machine.

Shaft 8 of saw 7 is driven by a belt 14 from a pulley 15 on a motor 16 which is secured to one side of a vertical mounting plate 17 having its lower edge provided with spaced apart apertured ears 18 for pivoting to the lower edge of a vertical supporting plate 19. The plate 19 is fixed to a pair of bars 20 at the rear of the machine and below the saw so that belt 14 is inclined upwardly from the motor.

A bell-crank lever 21 is pivoted at its central portion on a block 22 attached to one of the bars 20 to provide a horizontal arm 23 on the bell crank and a downwardly extending arm 24. A vertical link 25 is pivoted at its lower end to the outer end of arm 23 and is pivoted at its upper end to a bracket 26 secured to the underside of arbor arm 9.

An extensible link 27 is provided with front and rear portions 28 and 29 connected to each other by a turnbuckle 30 and the front portion 28 is pivoted to the lower end of vertical arm 24 of the bell crank and the rear portion 29 extends freely through a slot 31 in plate 19 and is pivoted to mounting plate 17 by means of a bracket 32.

The angle adjusting bracket 10 is of conventional construction and includes a shaft 33 journaled in hanger bearings 34 at the underside of table 5 and a gear segment 35 is fixed to shaft 33 and is actuated by a worm gear 36 and handle 37 at one side of the machine. A plate 38 is also fixed to shaft 33 for turning movement by the shaft and the rods 20 pass through the legs of bracket 10 and are supported in gear segment 35 and in plate 38.

Accordingly, as the angle of the saw 7 is adjusted the motor mounting plates 17 and 19 are similarly adjusted to prevent distortion of the belt drive.

Also, when the saw is vertically adjusted by handle 13 and arbor arm 9 the motor mounting plate 17 will likewise be adjusted by the bell crank 21 and links 25 and 27 to maintain a desired driving tension on belt 14.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a saw machine, the combination of a vertically swingable circular saw arbor and a motor mounting at the rear of the machine including a stationary member and a swingable member movable inwardly and outwardly with respect to the stationary member, a motor on the swingable member, a belt drive connecting the motor to the saw, adjustable means for the saw arbor, and means connecting the arbor to the swingable member of the motor mounting to synchronize adjustment thereof, said connecting means including a bell crank lever having a horizontally positioned arm and a vertically positioned arm, means pivotally supporting said bell crank lever in a stationary position under the arbor and in front of the swingable member, a link connecting the horizontal arm to the arbor, and a link connecting the vertical arm to the swingable member of the motor mounting.

2. The combination of claim 1 wherein at least one of said links includes turnbuckle adjusting means.

EDGAR J. HITCHCOCK.

References Cited in the file of this patent

UNITED STATES PATENTS

| Number | Name | Date |
| --- | --- | --- |
| 1,695,188 | Henkel | Dec. 11, 1928 |
| 1,723,077 | Richards | Aug. 6, 1929 |
| 2,121,069 | Collins | June 21, 1938 |
| 2,168,282 | Tautz | Aug. 1, 1939 |
| 2,625,966 | Copp | Jan. 20, 1953 |